United States Patent
Shin

(10) Patent No.: US 9,967,495 B2
(45) Date of Patent: May 8, 2018

(54) IMAGE SENSING DEVICE AND METHOD FOR DRIVING THE SAME

(71) Applicant: SK hynix Inc., Gyeonggi-do (KR)

(72) Inventor: Min-Seok Shin, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days. days.

(21) Appl. No.: 15/177,765

(22) Filed: Jun. 9, 2016

(65) Prior Publication Data

US 2017/0223294 A1 Aug. 3, 2017

(30) Foreign Application Priority Data

Jan. 29, 2016 (KR) ........................ 10-2016-0011737

(51) Int. Cl.
*H04N 3/14* (2006.01)
*H04N 5/335* (2011.01)
*H04N 5/3745* (2011.01)
*H04N 5/365* (2011.01)

(52) U.S. Cl.
CPC ....... *H04N 5/37457* (2013.01); *H04N 5/3653* (2013.01)

(58) Field of Classification Search
CPC .................................................. H04N 5/3745

USPC ................................................. 348/294–310
See application file for complete search history.

(56) References Cited

U.S. PATENT DOCUMENTS

| | | | | |
|---|---|---|---|---|
| 6,956,605 | B1 * | 10/2005 | Hashimoto | H01L 27/14609 250/208.1 |
| 2003/0227552 | A1 * | 12/2003 | Watanabe | H04N 9/045 348/220.1 |
| 2006/0231732 | A1 * | 10/2006 | Yan | H04N 5/378 250/208.1 |
| 2010/0002116 | A1 * | 1/2010 | Ostlund | H04N 5/232 348/308 |

FOREIGN PATENT DOCUMENTS

KR 1020110085768 7/2011

* cited by examiner

*Primary Examiner* — Anthony J Daniels
(74) *Attorney, Agent, or Firm* — IP & T Group LLP

(57) ABSTRACT

An image sensing device includes a plurality of pixel groups, each pixel group including two or more neighboring pixels, and a controller suitable for controlling the pixel groups on a basis of a frame unit, wherein a readout order of the pixels in each of the pixel groups is different between present and next frames.

15 Claims, 3 Drawing Sheets

IMAGE SENSING DEVICE AND METHOD FOR DRIVING THE SAME

CROSS-REFERENCE TO RELATED APPLICATIONS

The present application claims priority under 35 U.S.C § 119(a) of Korean Patent Application No. 10-2016-0011737, filed on Jan. 29, 2016, which is incorporated herein by reference in its entirety.

BACKGROUND

1. Field

Exemplary embodiments of the present invention relate to a semiconductor design technology and, more particularly, to an image sensing device and a method for driving the same.

2. Description of the Related Art

Image sensing devices capture images using photosensitive properties of semiconductors. Image sensing devices are often classified into charge-coupled device (CCD) image sensors and complementary metal-oxide semiconductor (CMOS) image sensors. CMOS image sensors allow for both analog and digital control circuits to be directly realized on a single integrated circuit (IC), and are the most widely used type of image sensors.

SUMMARY

Exemplary embodiments of the present invention are directed to an image sensing device that diffuses fixed pattern noise and a method for driving the image sensing device. The fixed pattern noise may be occurring due to a pixel offset, for example.

In an embodiment of the present invention, an image sensing device includes: a plurality of pixel groups, each pixel group including two or more neighboring pixels; and a controller suitable for controlling the pixel groups on a basis of a frame unit, wherein a readout order of the pixels in each of the pixel groups is different between present and next frames.

A portion of the structure of the pixels in each pixel group may be shared between the pixels in the pixel group.

Each of the pixel groups may include: two or more photo diodes; two or more transmission units suitable for selectively transmitting a photocharge generated in the photo diodes to a floating diffusion node; an initialization unit suitable for initializing the floating diffusion node; a driving unit suitable for driving a pixel signal with a driving voltage based on a voltage loaded on the floating diffusion node; and a selection unit suitable for transmitting the pixel signal to a column line.

The controller may generate two or more transmission control signals for controlling the transmission units and change an enabling order of the transmission control signals between the present and next frames.

The controller may change an initialization order of the pixels between the present and next frames.

The controller may control an initialization order of the pixels the same as a readout order of the pixels in each frame.

The controller may change a readout order of pixels arranged in a row direction among the pixels between the present and next frames.

The controller may change a readout order of pixels arranged in a column direction among the pixels between the present and next frames.

In another embodiment of the present invention, a method for driving an image sensing device includes: reading out pixel signals of two or more pixels based on a first order during a first readout time of a first frame time, wherein a portion of the pixels is shared; and reading out the pixel signals of the pixels based on a second order during a second readout time of a second frame time.

The method may further include: initializing the pixels based on the first order during a first initialization time of the first frame time.

The first initialization time may be ahead of the first readout time.

The method may further include: initializing the pixels based on the second order during a second initialization time of the second frame time.

The second initialization time may be ahead of the second readout time.

Readout orders of pixels arranged in a row direction among the pixels may be different from each other in the first and second orders.

Readout orders of pixels arranged in a column direction among the pixels may be different from each other in the first and second orders.

BRIEF DESCRIPTION OF THE DRAWINGS

The present invention will now be explained with the help of example embodiments described in connection with the following drawings wherein.

DETAILED DESCRIPTION

Exemplary embodiments of the present invention are described below in more detail with reference to the accompanying drawings. The present invention may, however, be embodied in different forms and should not be construed as being limited to the embodiments set forth herein. Rather, these embodiments are provided so that this disclosure is thorough and complete, and fully convey the present invention to those skilled in the art. All "embodiments" referred to in this disclosure refer to embodiments of the inventive concept disclosed herein. The embodiments presented are merely examples and are not intended to limit the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, indicate the presence of stated features, but do not preclude the presence or addition of one or more other features. As used herein, the term "and/or" indicates any and all combinations of one or more of the associated listed items.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

In some instances, as would be apparent to one of ordinary skill in the art elements described in connection with a particular embodiment may be used singly or in combination with other embodiments unless otherwise specifically indicated.

Hereinafter, the various embodiments of the present invention will be described in detail with reference to the attached drawings.

Figure 1:
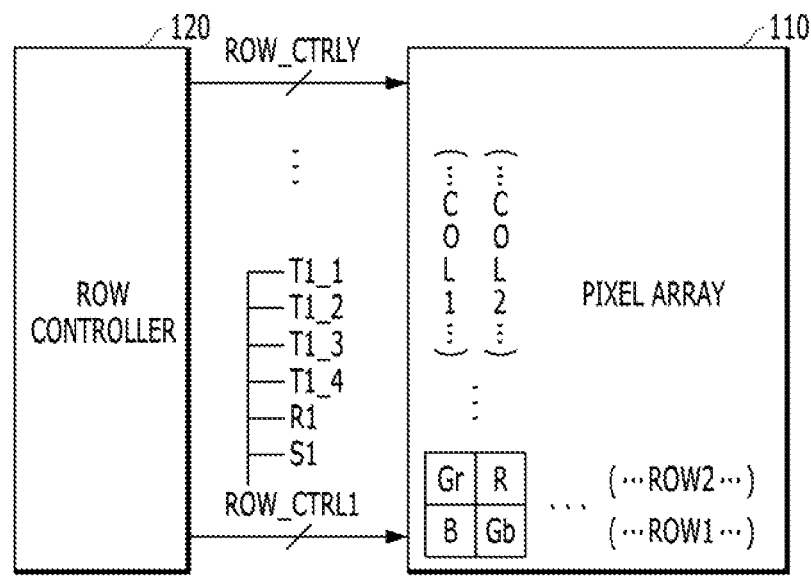
FIG. 1 is a block diagram illustrating an image sensing device, according to an embodiment of the present invention.

Referring now to FIG. 1 an image sensing device 100 is provided, according to an embodiment of the present invention.

According to the embodiment of FIG. 1, an image sensing device 100 may include a pixel array 110 and a row controller 120.

The pixel array 110 may have a plurality of pixels arranged in a row and a column direction. The pixels may be arranged in a predetermined pattern. For example, the pixels may be arranged in a Bayer pattern. The Bayer pattern may be formed of repeated patterns of cells each having 2*2 pixels. In each of the cells, two green-colored pixels Gr and Gb may be arranged to face each other on diagonal corners, and a red-colored pixel R and a blue-colored pixel B may be arranged on the other corners. Hereinafter, the 2*2 pixels arranged in the Bayer pattern are referred to as a "pixel group". A portion of the four pixels included in the pixel group may have a common structure. For example, the pixel group may have a four-pixel shared structure. The four-pixel shared structure will be described in detail below (refer to FIG. 2).

The row controller 120 may control the pixel array 110 on a basis of a frame unit. However, the row controller 120 may differently control a readout order of a pixel group corresponding to a present frame and a readout order of a pixel group corresponding to a next frame. For example, the row controller 120 may control the readout order (B→Gb→Gr→R) of the pixel group so that the pixel group is read out in the order of the blue-colored pixel B first, followed by the green-colored pixel Gb second, then the green-colored pixel Gr third, and finally the red-colored pixel R fourth during a first frame time corresponding to the present frame. The row controller 120 may control the readout order (Gb→B→Gr→R) of the pixel group so that the pixel group is read out in order of the green-colored pixel Gb first, followed by the blue-colored pixel B second, then the green-colored pixel Gr third, and finally the red-colored pixel R fourth during a second frame time corresponding to the next frame. The row controller 120 may change the readout order of two or more pixels arranged in a row direction as above. The row controller 120 may change the readout order of the pixels arranged in a column direction. The row controller 120 may change both of the readout order of the pixels arranged in the row direction and the readout order of the pixels arranged in the column direction.

In addition, the row controller 120 may differently control an initialization order of the pixel group corresponding to the present frame and an initialization order of the pixel group corresponding to the next frame. However, the row controller 120 has to control the initialization order and the readout order for the same frame in the same manner. For example, the row controller 120 may control the initialization order and readout order of the pixel group in the same manner during the first frame time and may control the initialization order and readout order of the pixel group in the same manner during the second frame time. This is for maintaining the same exposure time for each frame time.

The row controller 120 may control a single frame on a basis of a row unit. For example, the row controller 120 may generate first to $Y^{th}$ row control signals ROW_CTRL1 to ROW_CTRLY. Each of the first to $Y^{th}$ row control signals ROW_CTRL1 to ROW_CTRLY may control the pixels arranged in two rows, i.e., the pixel group. For example, the first row control signal ROW_CTRL1 may include first to fourth transmission control signals T1_1, T1_2, T1_3 and T1_4, a first reset control signal R1 and a first selection control signal S1 for controlling the pixels arranged in a first row ROW1 and a second ROW2.

Figure 2:
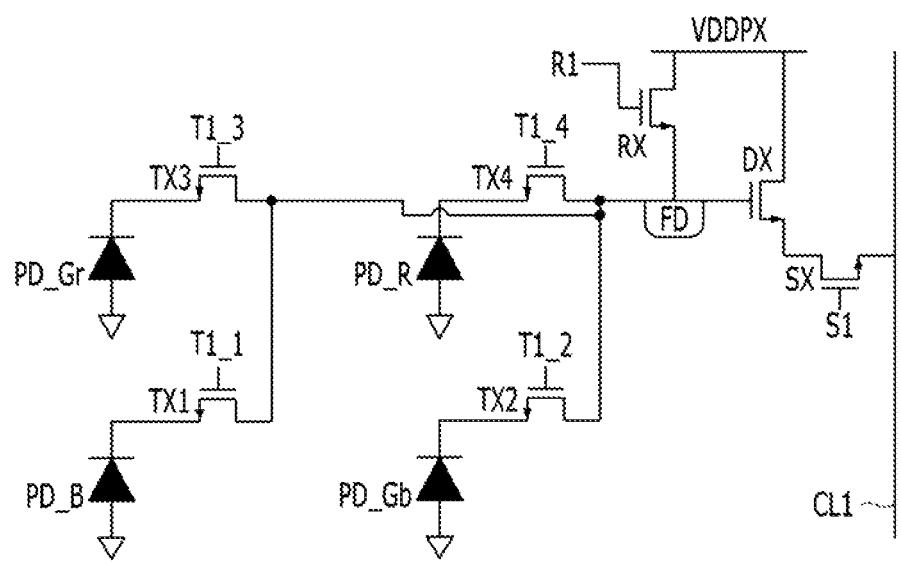
FIG. 2 is a circuit diagram illustrating an example configuration of a pixel group shown in FIG. 1.

FIG. 2 is a circuit diagram illustrating an example configuration for the pixel group shown in FIG. 1. In the illustrated embodiment of FIG. 1, the pixel group arranged at a cross point of the first and second rows ROW1 and ROW2 and first and second columns COL1 and COL2 is representatively described.

According to the embodiment of FIG. 2, the pixel group has a four-pixel shared structure. As illustrated, the pixel group may include first to fourth photo diodes PD_B, PD_Gb, PD_Gr and PD_R, first to fourth transmission units TX1, TX2, TX3 and TX4, a floating diffusion node FD, an initialization unit RX, a driving unit DX, and a selection unit SX.

The first photo diode PD_B corresponds to the blue-colored pixel B. For example, the first photo diode PD_B may generate a photocharge corresponding to incident light during a first exposure time. The first exposure time may range from a moment when a first initialization time terminates to a moment when a first transmission time starts. During the first initialization time, a photocharge remaining in the first photo diode PD_B is discharged into a driving voltage VDDPX terminal. During the first transmission time, the photocharge generated in the first photo diode PD_B is transmitted to the floating diffusion node FD.

The second photo diode PD_Gb corresponds to the green-colored pixel Gb. For example, the second photo diode PD_Gb may generate a photocharge corresponding to incident light during a second exposure time. The second exposure time may range from a moment when a second initialization time terminates to a moment when a second transmission time starts. During the second initialization time, a photocharge remaining in the second photo diode PD_Gb is discharged into the driving voltage VDDPX terminal, and during the second transmission time, the photocharge generated in the second photo diode PD_Gb is transmitted to the floating diffusion node FD.

The third photo diode PD_Gr corresponds to the green-colored pixel Gr. For example, the third photo diode PD_Gr may generate a photocharge corresponding to incident light during a third exposure time. The third exposure time may range from a moment when a third initialization time terminates to a moment when a third transmission time starts. During the third initialization time, a photocharge remaining in the third photo diode PD_Gr is discharged into the driving voltage VDDPX terminal, and during the third transmission time, the photocharge generated in the third photo diode PD_Gr is transmitted to the floating diffusion node FD.

The fourth photo diode PD_R corresponds to the red-colored pixel R. For example, the red-colored pixel R may generate a photocharge corresponding to incident light during a fourth exposure time. The fourth exposure time may range from a moment when a fourth initialization time terminates to a moment when a fourth transmission time starts. During the fourth initialization time, a photocharge remaining in the fourth photo diode PD_R is discharged into the driving voltage VDDPX terminal, and during the fourth transmission time, the photocharge generated in the fourth photo diode PD_R is transmitted to the floating diffusion node FD.

The first transmission unit TX1 is formed between the first photo diode PD_B and the floating diffusion node FD. For example, the first transmission unit TX1 may be enabled along with the initialization unit RX and may transmit the photocharge remaining in the first photo diode PD_B to the driving voltage VDDPX terminal through the initialization unit RX, in response to the first transmission control signal T1_1 during the first initialization time. In addition, the first transmission unit TX1 may transmit the photocharge generated in the first photo diode PD_B to the floating diffusion node FD, in response to the first transmission control signal T1_1 during the first transmission time. The first transmission unit TX1 may include an NMOS transistor having a gate to which the first transmission control signal T1_1 is inputted and a drain and a source coupled between the floating diffusion node FD and the first photo diode PD_B, respectively.

The second transmission unit TX2 may be formed between the second photo diode PD_Gb and the floating diffusion node FD. For example, the second transmission unit TX2 may be enabled along with the initialization unit RX and may transmit the photocharge remaining in the second photo diode PD_Gb to the driving voltage VDDPX terminal through the initialization unit RX, in response to the second transmission control signal T1_2 during the second initialization time. In addition, the second transmission unit TX2 may transmit the photocharge generated in the second photo diode PD_Gb to the floating diffusion node FD, in response to the second transmission control signal T1_2 during the second transmission time. The second transmission unit TX2 may include an NMOS transistor having a gate to which the second transmission control signal T1_2 is inputted and a drain and a source coupled between the floating diffusion node FD and the second photo diode PD_Gb, respectively.

The third transmission unit TX3 may be formed between the third photo diode PD_Gr and the floating diffusion node FD. For example, the third transmission unit TX3 may be enabled along with the initialization unit RX and may transmit the photocharge remaining in the third photo diode PD_Gr to the driving voltage VDDPX terminal through the initialization unit RX, in response to the third transmission control signal T1_3 during the third initialization time. In addition, the third transmission unit TX3 may transmit the photocharge generated in the third photo diode PD_Gr to the floating diffusion node FD, in response to the third transmission control signal T1_3 during the third transmission time. The third transmission unit TX3 may include an NMOS transistor having a gate to which the third transmission control signal T1_3 is inputted and a drain and a source coupled between the floating diffusion node FD and the third photo diode PD_Gr, respectively.

The fourth transmission unit TX4 may be formed between the fourth photo diode PD_R and the floating diffusion node FD. For example, the fourth transmission unit TX4 may be enabled along with the initialization unit RX and may transmit the photocharge remaining in the fourth photo diode PD_R to the driving voltage VDDPX terminal through the initialization unit RX, in response to the fourth transmission control signal T1_4 during the fourth initialization time. In addition, the fourth transmission unit TX4 may transmit the photocharge generated in the fourth photo diode PD_R to the floating diffusion node FD, in response to the fourth transmission control signal T1_4 during the fourth transmission time. The fourth transmission unit TX4 may include an NMOS transistor having a gate to which the fourth transmission control signal T1_4 is inputted and a drain and a source coupled between the floating diffusion node FD and the fourth photo diode PD_R, respectively.

The floating diffusion node FD may accumulate the photocharge. For example, a junction capacitor (not illustrated) may be coupled to the floating diffusion node FD, and the photocharge may be accumulated in the junction capacitor.

The initialization unit RX may initialize the floating diffusion node FD, in response to the first reset control signal R1 during the first to fourth initialization times. For example, the initialization unit RX may discharge the photocharges transmitted through the first to fourth transmission units TX1, TX2, TX3 and TX4 into the driving voltage VDDPX terminal while discharging the photocharge remaining in the junction capacitor into the driving voltage VDDPX terminal. In addition, the initialization unit RX may initialize the floating diffusion node FD, in response to the first reset control signal R1 during first to fourth reference times before the first to fourth transmission times. The initialization unit RX may include an NMOS transistor having a gate to which the first reset control signal R1 is inputted and a drain and a source coupled between the driving voltage VDDPX terminal and the floating diffusion node FD, respectively.

The driving unit DX may drive a pixel signal with a driving voltage VDDPX based on a voltage loaded on the floating diffusion node FD. For example, the driving unit DX may generate a first reference signal corresponding to the driving voltage VDDPX as the pixel signal during the first reference time, and generate a first data signal corresponding to the photocharge of the first photo diode PD_B as the pixel signal during the first transmission time. The driving unit DX may generate a fourth reference signal corresponding to the driving voltage VDDPX as the pixel signal during the fourth reference time, and generate a fourth data signal corresponding to the photocharge of the fourth photo diode PD_R as the pixel signal during the fourth transmission time. The driving unit DX may include an NMOS transistor having a gate coupled to the floating diffusion node FD and a drain and a source coupled between the driving voltage VDDPX terminal and the selection unit SX.

The selection unit SX may transmit the pixel signal to a first column line CL1, in response to the first selection control signal S1. For example, the selection unit SX may include an NMOS transistor having a gate to which the first selection control signal S1 is inputted and a drain and a source coupled between the driving unit DX and the first column line CL1.

Hereinafter, an operation of the image sensing device 100 having the aforementioned structure is described below with reference to FIGS. 3 and 4.

For simple description, an operation corresponding to a first frame time FT1 and a second frame time FT2 is described. Also, an operation of the pixel group arranged at the cross point of the first and second rows ROW1 and ROW2 and the first and second columns COL1 and COL2 is representatively described.

Figure 3:
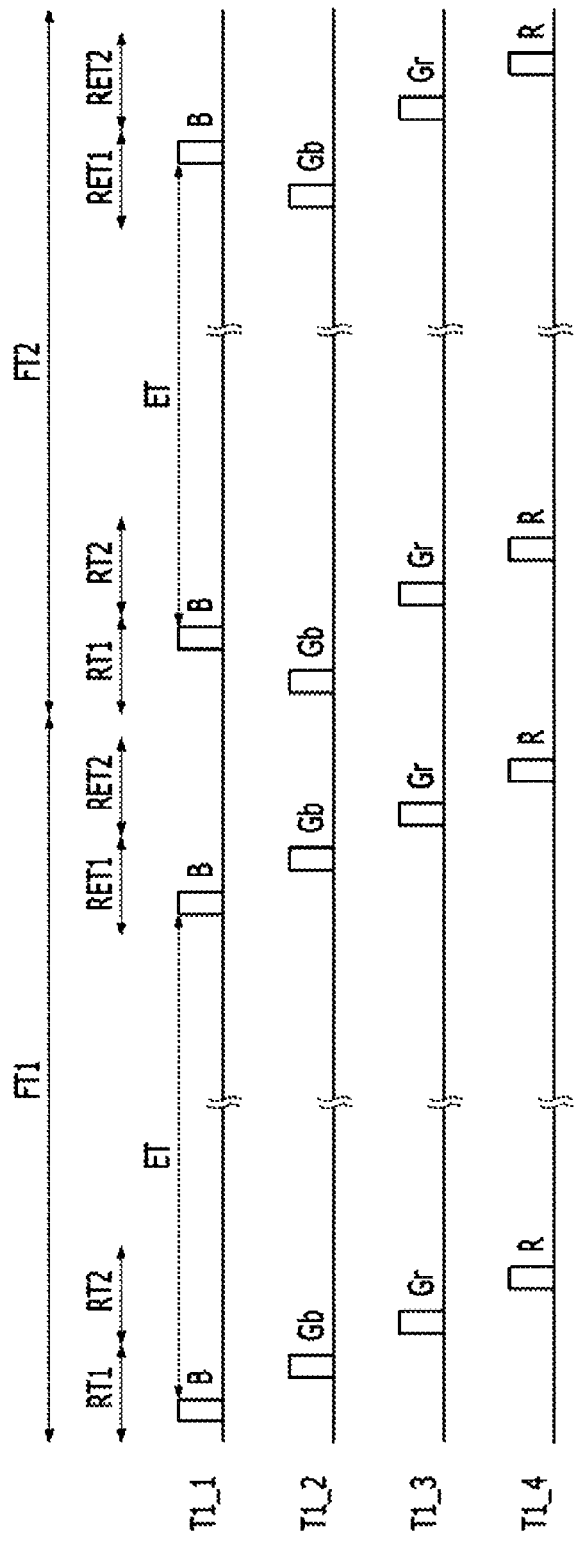
FIG. 3 is a timing diagram for an operation of the image sensing device shown in FIG. 1, according to an embodiment of the present invention.

FIG. 3 is a timing diagram describing the operation of the image sensing device 100 shown in FIG. 1, according to an embodiment of the present invention.

Referring to FIG. 3, the image sensing device 100 may read out pixel signals from the pixel group based on a first order during the first frame time FT1 and read out pixel signals from the pixel group based on a second order, which is different from the first order, during the second frame time FT2. That is, a readout order of the pixels included the pixel group may be different between the present and the next frame.

First, the operation of the image sensing device 100 corresponding to the first frame time FT1 is described in detail.

As illustrated in FIG. 3, the row controller 120 generates the first to fourth transmission control signals T1_1, T1_2, T1_3 and T1_4 based on the first order during the first frame time FT1. For example, the row controller 120 may sequentially generate the first to fourth transmission control signals T1_1, T1_2, T1_3 and T1_4 during first and second row initialization times RT1 and RT2 and subsequently, may sequentially generate the first to fourth transmission control signals T1_1, T1_2, T1_3 and T1_4 during first and second row readout times RET1 and RET2. In other words, the row controller 120 may enable the first transmission control signal T1_1 during the first initialization time of the first row initialization time RT1 and enable the second transmission control signal T1_2 during the second initialization time of the first row initialization time RT1. The row controller 120 may enable the third transmission control signal T1_3 during the third initialization time of the second row initialization time RT2 and enable the fourth transmission control signal T1_4 during the fourth initialization time of the second row initialization time RT2. In addition, the row controller 120 may enable the first transmission control signal T1_1 during the first transmission time of the first row readout time RET1 and enable the second transmission control signal T1_2 during the second transmission time of the first row readout time RET1. The row controller 120 may enable the third transmission control signal T1_3 during the third transmission time of the second row readout time RET2 and enable the fourth transmission control signal T1_4 during the fourth transmission time of the second row readout time RET2. A time ranging from a moment when the first to fourth transmission control signals T1_1, T1_2, T1_3 and T1_4 are disabled in the first and second row initialization times RT1 and RT2 to a moment when the first to fourth transmission control signals T1_1, T1_2, T1_3 and T1_4 are enabled in the first and second row readout times RET1 and RET2 may be referred to as an exposure time ET, and the first to fourth photo diodes PD_B, PD_Gb, PD_Gr and PD_R may generate the photocharge during each exposure time ET.

In actuality, the row controller 120 may sequentially generate the first and second transmission control signals T1_1 and T1_2 during the first row initialization time RT1 and subsequently during the first row readout time RET1. And, the row controller 120 may sequentially generate the third and fourth transmission control signals T1_3 and T1_4 during the second row initialization time RT2 and subsequently during the second row readout time RET2. However, for focusing on an initialization order and a readout order in the embodiment of the present invention, the first and second row initialization times RT1 and RT2 are lumped together, and also the first and second row readout times RET1 and RET2 are lumped together.

Although not illustrated, the row controller 120 may generate the first reset control signal R1 corresponding to the first to fourth transmission control signals T1_1, T1_2, T1_3 and T1_4 during the first and second row initialization times RT1 and RT2. For example, the row controller 120 may enable the first reset control signal R1 during the first to fourth initialization times. In addition, the row controller 120 may generate the first reset control signal R1 corresponding to the first to fourth transmission control signals T1_1, T1_2, T1_3 and T1_4 during the first and second row readout times RET1 and RET2. For example, the row controller 120 may enable the first reset control signal R1 during the first to fourth reference times before the first to fourth transmission times. Further, the row controller 120 may generate the first selection control signal S1 during the first and second row readout times RET1 and RET2. For example, the row controller 120 may enable the first selection control signal S1 during a time including the first reference time and the first transmission time, a time including the second reference time and the second transmission time, a time including the third reference time and the third transmission time, and a time including the fourth reference time and the fourth transmission time.

The pixel group may initialize the first to fourth photo diodes PD_B, PD_Gb, PD_Gr and PD_R according to the first order during the first and second row initialization times RT1 and RT2 and may read out the first to fourth pixel signals corresponding to the first to fourth photo diodes PD_B, PD_Gb, PD_Gr and PD_R according to the first order during the first and second row readout times RET1 and RET2, in response to the first reset control signal R1, the first to fourth transmission control signals T1_1, T1_2, T1_3 and T1_4, and the first selection control signal S1.

Next, an operation of the image sensing device 100 corresponding to the second frame time FT2 is described in detail.

The row controller 120 may generate the first to fourth transmission control signals T1_1, T1_2, T1_3 and T1_4 based on the second order during the second frame time FT2. For example, the row controller 120 may sequentially generate the second and first transmission control signals T1_2 and T1_1 during the first row initialization time RT1 and the third and fourth transmission control signals T1_3 and T1_4 during the second row initialization time RT2. And subsequently, the row controller 120 may sequentially generate the second and first transmission control signals T1_2 and T1_1 during the first row readout time RET1 and the third and fourth transmission control signals T1_3 and T1_4 during the second row readout time RET2. In other words, the row controller 120 may enable the second transmission control signal T1_2 during the first initialization time of the first row initialization time RT1 and enable the first transmission control signal T1_1 during the second initialization time of the first row initialization time RT1. The row controller 120 may enable the third transmission control signal T1_3 during the third initialization time of the second row initialization time RT2 and enable the fourth transmission control signal T1_4 during the fourth initialization time of the second row initialization time RT2. In addition, the row controller 120 may enable the second transmission control signal T1_2 during the first transmission time of the first row readout time RET1 and enable the first transmission control signal T1_1 during the second transmission time of the first row readout time RET1. The row controller 120 may enable the third transmission control signal T1_3 during the third transmission time of the second row readout time RET2 and enable the fourth transmission control signal T1_4 during the fourth transmission time of the second row readout time RET2.

Although not illustrated, the row controller 120 may generate the first reset control signal R1 and the first selection control signal S1 in the second frame time FT2, same as in the first frame time FT1.

The pixel group may initialize the first to fourth photo diodes PD_B, PD_Gb, PD_Gr and PD_R according to the second order during the first and second row initialization times RT1 and RT2 and may read out the first to fourth pixel signals corresponding to the first to fourth photo diodes PD_B, PD_Gb, PD_Gr and PD_R according to the second order during the first and second row readout times RET1 and RET2, in response to the first reset control signal R1, the first to fourth transmission control signals T1_1, T1_2, T1_3 and T1_4, and the first selection control signal S1. The initialization and readout order of the pixels arranged in the first row ROW1 of the pixel group is changed in the second order as compared with the first order.

Figure 4:
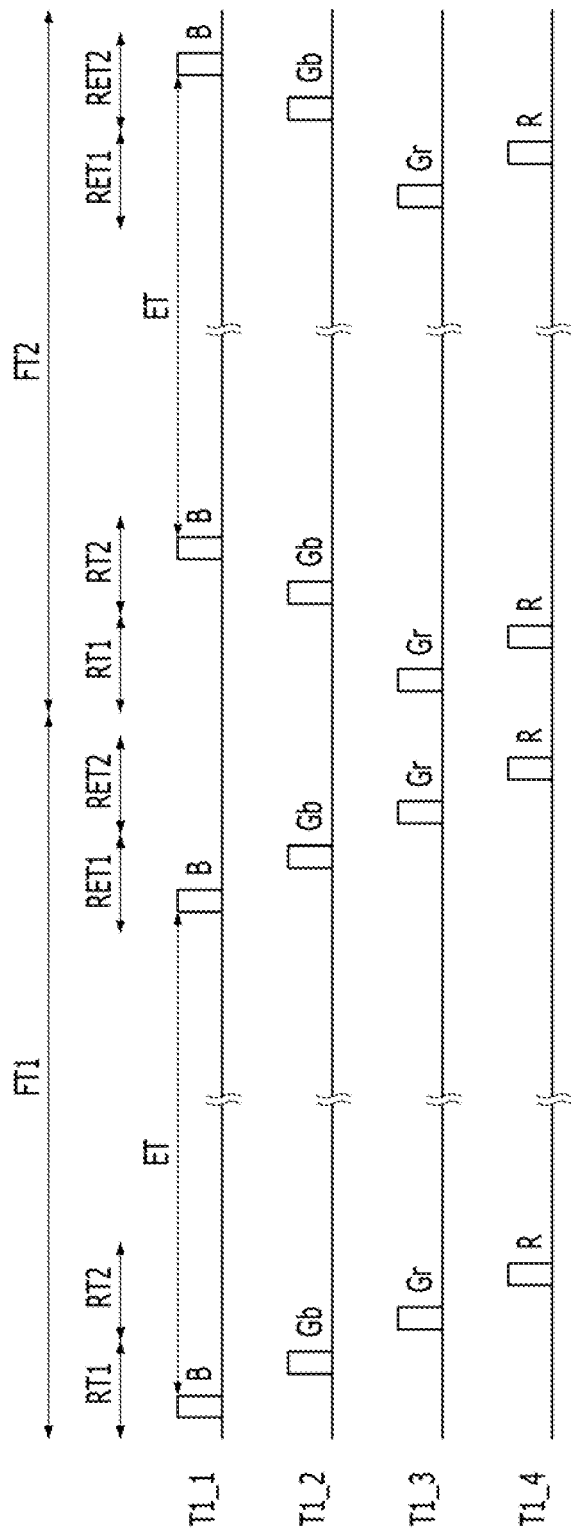
FIG. 4 is a timing diagram for an operation of the image sensing device shown in FIG. 1, according to another embodiment of the present invention.

FIG. 4 is another timing diagram describing an operation of the image sensing device 100 shown in FIG. 1, according to another embodiment of the present invention.

Referring to FIG. 4, the image sensing device 100 may read out pixel signals from the pixel group based on a first order during a first frame time FT1 and read out pixel signals from the pixel group based on a second order which is different from the first order during a second frame time FT2.

Since the operation of the image sensing device 100 corresponding to the first frame time FT1 is the same as the operation of the image sensing device 100 shown in FIG. 3, a detailed description thereon is omitted. The operation of the image sensing device 100 corresponding to the second frame time FT2 is described in detail below.

The row controller 120 may generate the first to fourth transmission control signals T1_1, T1_2, T1_3 and T1_4 based on the second order during the second frame time FT2. For example, the row controller 120 may sequentially generate the third and fourth transmission control signals T1_3 and T1_4 during a first row initialization time RT1 and the second and first transmission control signals T1_2 and T1_1 during a second row initialization time RT2. And subsequently, the row controller 120 may sequentially generate the third and fourth transmission control signals T1_3 and T1_4 during a first row readout time RET1 and the second and first transmission control signals T1_2 and T1_1 during a second row readout time RET2. In other words, the row controller 120 may enable the third transmission control signal T1_3 during the first initialization time of the first row initialization time RT1 and enable the fourth transmission control signal T1_4 during the second initialization time of the first row initialization time RT1. The row controller 120 may enable the second transmission control signal T1_2 during the third initialization time of the second row initialization time RT2 and enable the first transmission control signal T1_1 during the fourth initialization time of the second row initialization time RT2. In addition, the row controller 120 may enable the third transmission control signal T1_3 during the first transmission time of the first row readout time RET1 and enable the fourth transmission control signal T1_4 during the second transmission time of the first row readout time RET1. The row controller 120 may enable the second transmission control signal T1_2 during the third transmission time of the second row readout time RET2 and enable the first transmission control signal T1_1 during the fourth transmission time of the second row readout time RET2.

Although not illustrated, the row controller 120 may generate the first reset control signal R1 and the first selection control signal S1 in the second frame time FT2, same as in the first frame time FT1.

The pixel group may initialize the first to fourth photo diodes PD_B, PD_Gb, PD_Gr and PD_R according to the second order during the first and second row initialization times RT1 and RT2 and may read out the first to fourth pixel signals corresponding to the first to fourth photo diodes PD_B, PD_Gb, PD_Gr and PD_R according to the second order during the first and second row readout times RET1 and RET2, in response to the first reset control signal R1, the first to fourth transmission control signals T1_1, T1_2, T1_3 and T1_4, and the first selection control signal S1. The initialization and readout order of the pixels arranged in the first row ROW1 of the pixel group is changed and the initialization and readout order of the first and second columns COL1 and COL2 of the pixel group is changed in the second order as compared with the first order.

According to the embodiments of the present invention, as readout orders of pixels included in a pixel group are changed differently each frame, fixed pattern noise occurring due to a pixel offset may be diffused.

According to the embodiments of the present invention, as fixed pattern noise occurring due to a pixel offset is diffused, image quality of an image sensing device may be improved.

While the present invention has been described with respect to specific embodiments, the embodiments are not intended to be restrictive, but rather descriptive. Further, it is noted that the present invention may be achieved in various ways through substitution, change, and modification, by those skilled in the art without departing from the scope of the present invention as defined by the following claims.

For example, although an image sensing device including a pixel group of a four-pixel shared structure is described in the embodiments of the present invention, the inventive concept is not limited to this and may apply to an image sensing device including a pixel group of a two or more-shared pixel structure according to this invention.

What is claimed is:

1. An image sensing device, comprising:
   a plurality of pixel groups, each pixel group including two or more neighboring pixels; and
   a controller suitable for controlling to read out pixel signals from all of the pixels included in the pixel groups on a basis of a frame unit, wherein a readout order of the pixels included in each of the pixel groups is different between present and next frames, and the pixels, which are read out, are identical between the present and next frames, wherein two or more pixel signals are read out from the respective neighboring pixels included in each pixel group based on two or more transmission control signals, wherein, in the present frame, the controller generates the two or more transmission control signals, corresponding to the respective neighboring pixels included in each pixel group, in a first order during a readout time of the present frame, and wherein, in the next frame, the controller generates the two or more transmission control signals, corresponding to the same neighboring pixels, in a second order different from the first order during a readout time of the next frame.

2. The image sensing device of claim 1, wherein a portion of the structure of the pixels in each pixel group is shared between the pixels in the pixel group.

3. The image sensing device of claim 2, wherein each of the pixel groups includes:
two or more photo diodes;
two or more transmitters selectively transmitting a photocharge generated in the photo diodes to a floating diffusion node;
an initializer initializing the floating diffusion node;
a driver driving a pixel signal with a driving voltage based on a voltage loaded on the floating diffusion node; and
a selector transmitting the pixel signal to a column line.

4. The image sensing device of claim 3, wherein the controller changes an enabling order of the two or more transmission control signals between the present and next frames.

5. The image sensing device of claim 1, a initialization order of the pixels included in each of the pixel groups is different between present and next frames.

6. The image sensing device of claim 5, wherein each pixel group is initialized based on the two or more transmission control signals during an initialization time of the present frame and an initialization time of the next frame,
wherein, in the present frame, the controller generates the two or more transmission control signals, corresponding to the respective neighboring pixels included in each pixel group, in the first order during the initialization time of the present frame, and
wherein, in the next frame, the controller generates the two or more transmission control signals, corresponding to the same neighboring pixels, in the second order during the initialization time of the next frame.

7. The image sensing device of claim 1, wherein the controller changes a readout order of pixels arranged in a row direction among the pixels included in each of the pixel groups between the present and next frames.

8. The image sensing device of claim 1, wherein the controller changes a readout order of pixels arranged in a column direction among the pixels included in each of the pixel groups between the present and next frames.

9. A method for driving an image sensing device including a plurality of pixel groups, each pixel group including two or more neighboring pixels, the method comprising:
generating two or more transmission control signals, corresponding to the respective neighboring pixels included in each pixel group, in a first order during a first readout time of a first frame time;
reading out two or more pixel signals from the respective neighboring pixels included in each pixel group during the first readout time of the first frame time based on the two or more transmission control signals; and
generating the two or more transmission control signals, corresponding to the same neighboring pixels, in a second order different from the first order during a second readout time of a second frame time; and
reading out the two or more pixel signals from the same neighboring pixels during the second readout time of the second frame time based on the two or more transmission control signals.

10. The method of claim 9, further comprising:
generating the two or more transmission control signals, corresponding to the respective neighboring pixels included in each pixel group, in the first order during a first initialization time of the first frame time; and
initializing the neighboring pixels based on the two or more transmission control signals during the first initialization time.

11. The method of claim 10, wherein the first initialization time is ahead of the first readout time.

12. The method of claim 9, further comprising:
generating the two or more transmission control signals, corresponding to the same neighboring pixels, in the second order during the second initialization time of the second frame time; and
initializing the neighboring pixels based on the two or more transmission control signals during the second initialization time.

13. The method of claim 12, wherein the second initialization time is ahead of the second readout time.

14. The method of claim 9, wherein readout orders of pixels arranged in a row direction among the pixels included in each of the pixel groups are different from each other in the first and second orders.

15. The method of claim 9, wherein readout orders of pixels arranged in a column direction among the pixels included in each of the pixel groups are different from each other in the first and second orders.

* * * * *